June 17, 1958  C. T. WALLIS  2,838,782
WINDSHIELD WIPER ARM
Filed Feb. 23, 1955

INVENTOR.
Cyril T. Wallis
BY
G. H. Strickland
His Attorney

United States Patent Office 2,838,782
Patented June 17, 1958

2,838,782

WINDSHIELD WIPER ARM

Cyril T. Wallis, Brockport, N. Y., assignor to General Motors Corporation, Detroit, Mich., a corporation of Delaware Application February 23, 1955, Serial No. 490,086

8 Claims. (Cl. 15—255)

This invention pertains to the art of winshield wiping, and particularly to an improved wiper arm construction.

Conventional wiper arms include an inner socket section, and outer blade carrying section pivotally connected to the socket section, and some type of spring means interconnecting the two sections for applying wiping pressure to the outer section and the blade. Ordinarily, the outer section is formed with a pair of spaced ears that straddle the inner section, the two sections being pivotally interconnected by a pin which passes through aligned openings in the two sections. It has been observed that this type of hinge connection is structurally weak, and, therefore, subject to undesirable torsional deflection. This disadvantageous feature is obviated in the arm construction of this invention by joining the outer section ears by an integral strengthening web. Accordingly, among my objects are the provision of improved hinge means between inner and outer wiper arm sections; the further provision of an improved hinge member for a windshield wiper arm, and the still further provision of a wiper arm including an outer section having a pair of straddling ears and an integral supporting web therebetween.

The aforementioned and other objects are accomplished in the present invention by interconnecting spaced ears of an outer arm section by an arcuate web which is received by an arcuate groove in an inner arm section. Specifically, the inner arm section is adapted for connection with an oscillatable wiper actuating shaft. Thus, the inner section includes a socket portion having a radial extension constituting a hinge member. The hinge member has a central opening therethrough and a cylindrical portion concentric therewith. An arcuate groove is formed between a part of the periphery of the cylindrical portion and the socket section, and another part of the cylindrical portion is cut away. A cross pin is supported in the cut-away portion to form a support for one end of a helical pressure applying spring.

The outer arm section is designed for attachment to a wiper blade at its outer end, and for pivotal connection to the hinge member at its inner end. Thus, the inner end of the outer section is formed with a pair of spaced ears having aligned openings, the ears being arranged in straddling relation with respect to the hinge member. The two arm sections are interconnected by a pin which extends through aligned openings in the ears and the cylindrical portion of the hinge member. A reinforcing arcuate web integral with both ears, is received in the arcuate slot of the inner arm section. Outward pivotal movement of the outer arm section with respect to the inner arm section is limited by engagement between the web and the end of the arcuate slot. Inward pivotal movement of the outer arm section with respect to the inner arm section is also limited by engagement of the two sections. The pressure applying spring has its other end attached to a pin carried by the outer arm section, the spring being concealed by a cover plate.

Further objects and advantages of the present invention will be apparent from the following description, reference being had to the accompanying drawing wherein a preferred embodiment of the present invention is clearly shown.

Figure 1:
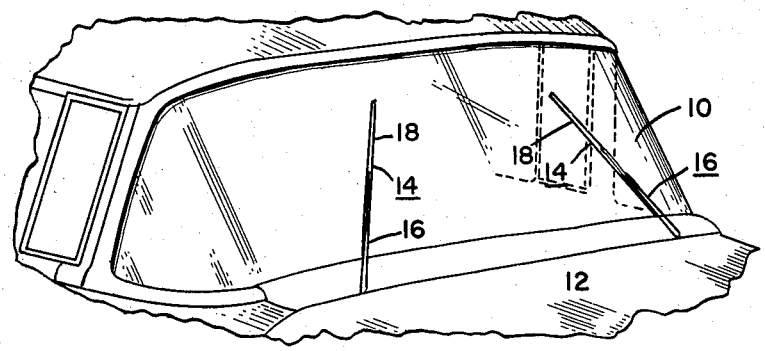
Fig. 1 is a fragmentary view of a vehicle equipped with the wiper arm of this invention.

With reference to Fig. 1, a vehicle is depicted having a wrap around windshield 10 and a cowl portion 12. According to conventional practice, the vehicle includes dual windshield wipers 14 which may be connected for asymmetrical operation. Each windshield wiper includes an arm 16, which is detachably connected to a blade 18, the arm 16 also being drivingly connected with an oscillatable rock shaft, not shown in Fig. 1, which projects through the vehicle cowl 12.

Figure 2:
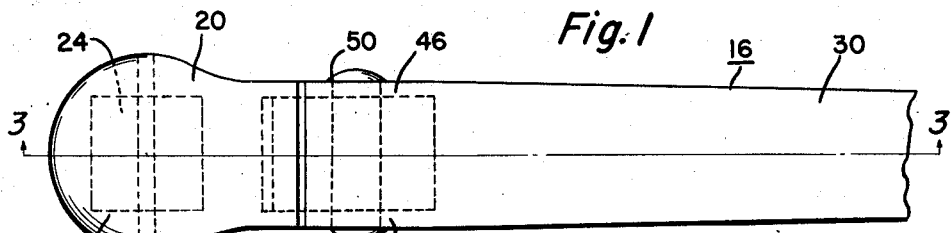
Fig. 2 is a fragmentary plan view of the arm.
Figure 3:
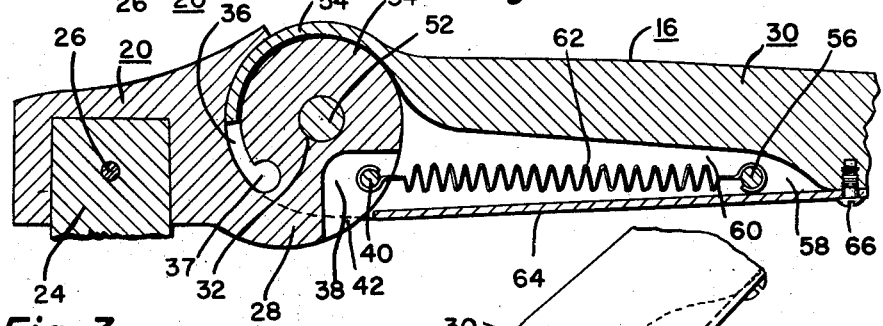
Fig. 3 is a sectional view taken along line 3—3 of Fig. 2.
Figure 4:
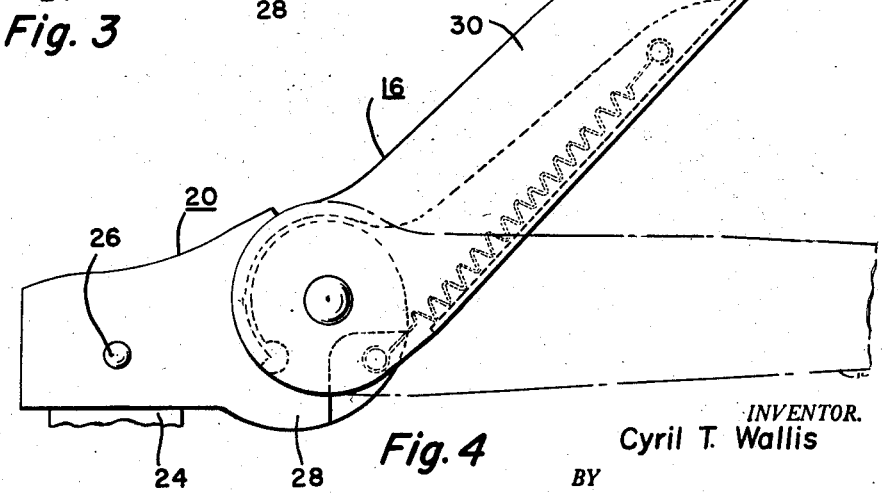
Fig. 4 is a fragmentary side view depicting the manner in which pivotal movement between the arm sections is accomplished.

With particular reference to Figs. 2 through 4, the details of the improved arm 16 will be described. The wiper arm includes an inner or socket section 20 having a square recess 22 therein. The square recess 22 is adapted to receive a complementary shaped end portion of an oscillatable actuating shaft 24, and the inner section 20 is shown connected to the rock shaft 24 by means of a cross pin 26. As seen in Figs. 2 through 4, the inner arm section 20 also includes a radial extension which constitutes a hinge member 28. Preferably, although not necessarily, the inner arm section comprises a zinc base die-casting.

The improved arm 16 also includes an outer arm section 30, which preferably comprises an aluminum die-casting, which may be channelled if desired. The outer arm section 30 is adapted to be detachably connected to the wiper blade 18 in a conventional manner. The inner end of the outer arm section 30 is pivotally connected to the hinge member 28 of the socket section 20 by the improved hinge construction of this invention. As alluded to hereinbefore, it has been observed that the hinge connection between the inner and outer sections of conventional wiper arms is structurally weak and tends to twist when subjected to heavy loading. This difficulty is obviated in the present invention.

As seen particularly in Fig. 3, the hinge member 28 of the inner arm section 20 has a cylindrical opening 32 therein, and a cylindrical portion 34 concentric with the opening 32. An arcuate groove 36 concentric with the cylindrical portion 34 is formed between a part of the periphery of the cylindrical portion 34 and the remaining part of the socket section 20. The slot 36 terminates in an enlarged drilled opening 37, which is initially formed to facilitate the cutting of the arcuate slot 36. In addition, the cylindrical portion 34 is cut away at 38 and a cross pin 40 is supported by the side flanges 42 thereof, only one of the side flanges being depicted in Fig. 3.

The inner end of the outer arm section 30 is formed with a pair of spaced ears 44 and 46, as seen in Fig. 2, which ears straddle the cylindrical portion 34 and have cylindrical openings 48 and 50, respectively, aligned with the opening 32. A suitable hinge pin 52 extends through the aligned openings in the ears and the cylindrical portion 34 so as to pivotally interconnect the inner and outer sections. In order to strengthen the hinge connection, the ears 46 and 44 are connected by an integral arcuate web 54, which is adapted to be received in the arcuate slot 36.

The outer arm section 30 also carries a pin 56, which is supported by side flanges 58 of a cut-away portion 60, only one flange being shown in Fig. 3. A pressure applying coiled spring 62 is disposed within the cut-away portion 60, opposite ends of the spring being connected to pins 40 and 56, respectively. The spring 62 biases the outer arm section 30 in a clockwise direction relative to the inner arm section 20, as viewed in Fig. 3, and in a conventional manner applies wiping pressure to the blade 18, which is carried by the wiper arm. The spring 62 in a conventional manner is concealed from view by a cover plate 64, which is attached to the outer arm section 30 by means of a screw 66.

Outward, or counterclockwise, pivotal movement of the outer arm section 30 relative to the inner arm section 20 is limited by engagement between the end of the arcuate web 54 with the wall of the terminating opening 37 of the arcuate slot 36. Inward, or clockwise, movement of the outer arm section 30 relative to the inner arm section 20 is limited by engagement of the cover plate 64 with the side flanges 42 of the inner arm section. The reinforcing web 54, which is integral with the straddling ears 44 and 46 of the outer arm section 30, results in a hinge construction which will withstand substantial twisting moment forces without any appreciable torsional deflection. Moreover, by using a hinge construction of the type disclosed herein, the tendency of arm failure at the hinge joint will be greatly reduced.

While the embodiment of the present invention as herein disclosed, constitutes a preferred form, it is to be understood that other forms might be adopted.

What is claimed is as follows:

1. A wiper arm comprising, an inner section having an arcuate slot therein, an outer section, and a hinge connection between said sections permitting pivotal movement therebetween, said hinge connection comprising a pair of spaced ears on said outer section which straddle said inner section, a pin pivotally interconnecting said ears and said inner section and an integral arcuate strengthening web interconnecting said spaced ears, said arcuate web being disposed in said arcuate slot and engageable with the end of said slot to limit pivotal movement between said inner and outer sections in one direction.

2. In a windshield wiper arm, an inner section, an outer section, and means pivotally interconnecting said inner and outer sections, said inner section having an integral cylindrical portion and means defining an arcuate slot concentric with said cylindrical portion throughout a part of its periphery, said outer section having a pair of spaced ears and an integral arcuate web joining said ears, the pivotal connection means between said inner and outer sections including a pin adapted to extend through aligned openings in said ears and said cylindrical portion when said ears are disposed in straddling relation with respct to said cylindrical portion, said arcuate web being disposed in said arcuate slot.

3. A wiper arm comprising, an inner section having an integral extension with a cylindrical portion and means defining an arcuate slot concentric with said cylindrical portion throughout a part of its periphery, an outer section having a pair of spaced ears and an integral arcuate web interconnecting said ears, and means pivotally interconnecting said inner and outer sections comprising a pin which extends through aligned openings in said ears and said cylindrical portion when said ears are arranged in straddling relation with respect to said cylindrical portion, said arcuate web being disposed within said arcuate slot when the inner and outer arm sections are so assembled.

4. A wiper arm comprising, an inner section having an integral extension with a cylindrical portion and means defining an arcuate slot concentric with said cylindrical portion throughout a part of its periphery, an outer section having a pair of spaced ears and an integral arcuate web interconnecting said ears, resilient means interconnecting said inner and outer arm sections for applying wiping pressure to said outer arm section, and means pivotally interconnecting said inner and outer sections comprising a pin which extends through aligned openings in said ears and said cylindrical portion when said ears are arranged in straddling relation with respect to said cylindrical portion, said arcuate web being disposed within said arcuate slot when the inner and outer arm sections are so assembled.

5. The wiper arm set forth in claim 4 wherein said resilient means comprises a coil spring, the cylindrical portion of said inner arms section including a cut-away portion, opposite ends of which are closed by spaced side flanges, a first pin supported by said side flanges and extending across said cut-away portion, a second pin carried by said outer arm section, said coil spring having opposite ends supported by said first and second pins.

6. The wiper arm set forth in claim 5 wherein said spring is disposed in a channeled groove of said outer arm section, and wherein said channeled groove is closed by a cover plate carried by said arm, said cover plate being adapted to engage the spaced side flanges on said arm section so as to limit pivotal movement of said outer arm section relative to said inner arm section in one direction.

7. The wiper arm set forth in claim 4 wherein said outer arm section is solid, and wherein pivotal movement of said outer arm section relative to said inner arm section in one direction is limited by engagement between said web and an end wall of said arcuate slot.

8. A windshield wiper arm comprising, an inner section having a shaft receiving socket and an integral radial extension, said radial extension having an arcuate slot therein defining a cylindrical portion having an axis located at substantially right angles to said socket, an outer section having a pair of spaced ears arranged to straddle said cylindrical portion and an integral arcuate web interconnecting at least portions of said ears, a hinge pin extending through said ears and said cylindrical portion for pivotally interconnecting the inner and outer sections, said arcuate web being engageable with the end of said arcuate slot to limit pivotal movement of the outer section relative to the inner section in one direction and resilient means interconnecting the inner and outer sections for applying wiping pressure to the outer section.

References Cited in the file of this patent

UNITED STATES PATENTS

| 2,602,950 | Sacchini | July 15, 1952 |
| 2,715,238 | Krohm | Aug. 16, 1955 |
| 2,715,729 | Anderson | Aug. 16, 1955 |

FOREIGN PATENTS

| 173,031 | Austria | Apr. 15, 1952 |